Nov. 24, 1953 — N. H. ROY — 2,660,387
VIBRATION AND SHOCK ISOLATOR
Filed Dec. 29, 1951 — 2 Sheets-Sheet 2
Fig. 3,
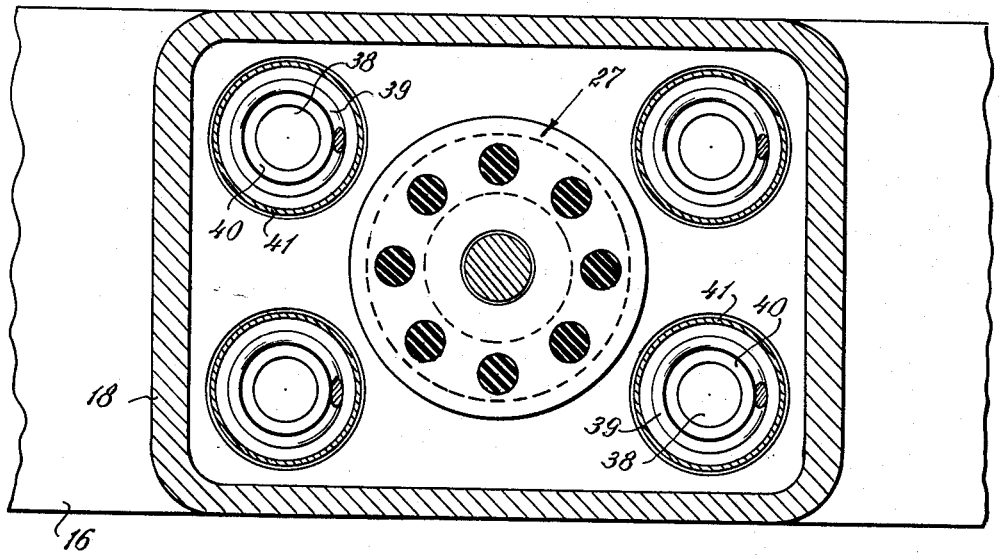
Fig. 4.
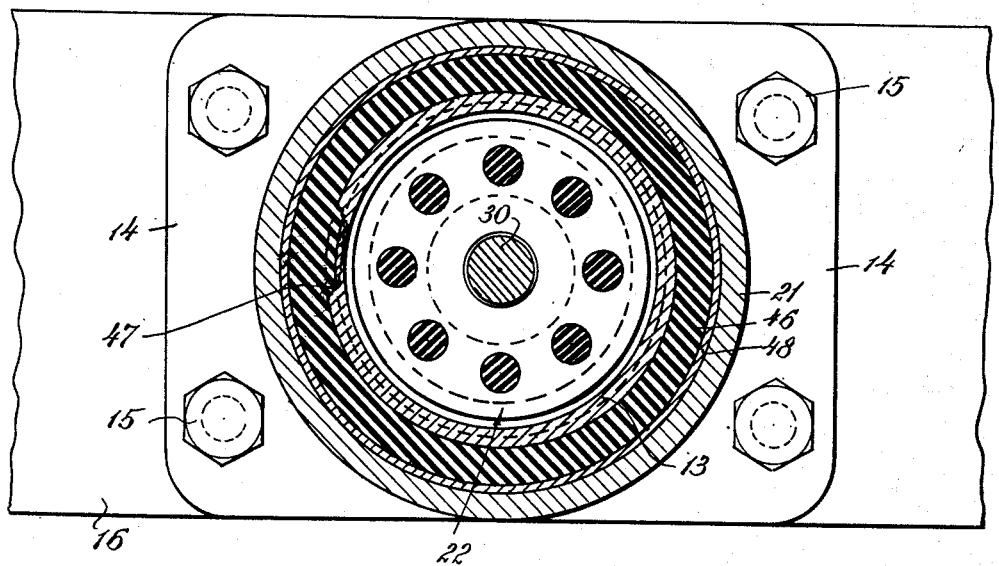
INVENTOR
Nereus H. Roy
BY
Pennie Edmonds Morton Barrows Taylor
ATTORNEYS Patented Nov. 24, 1953

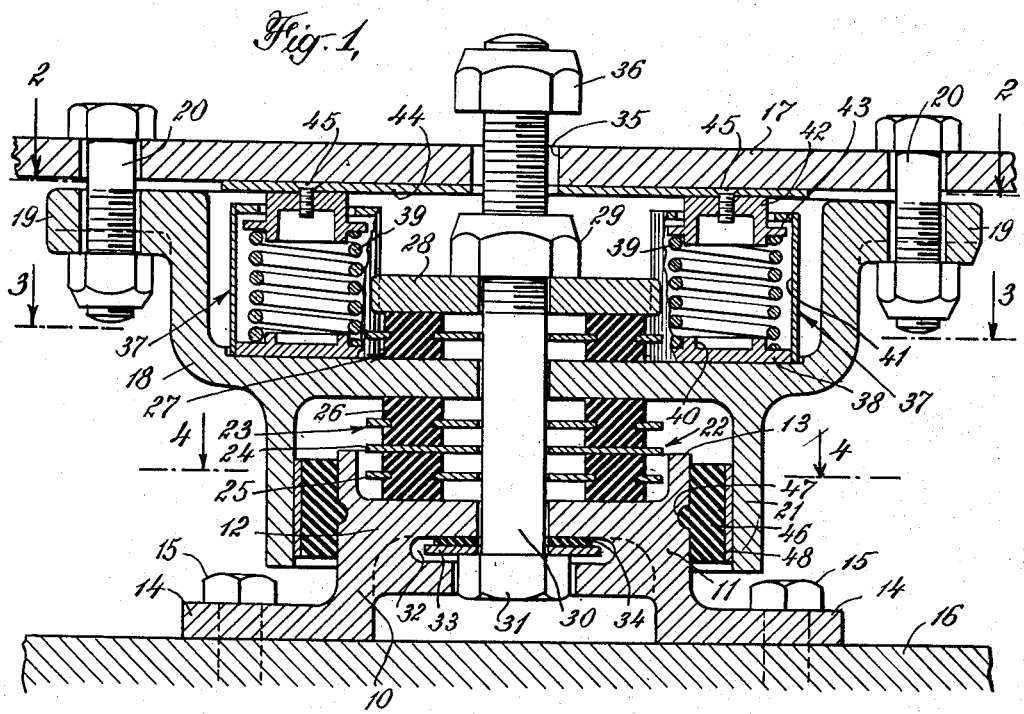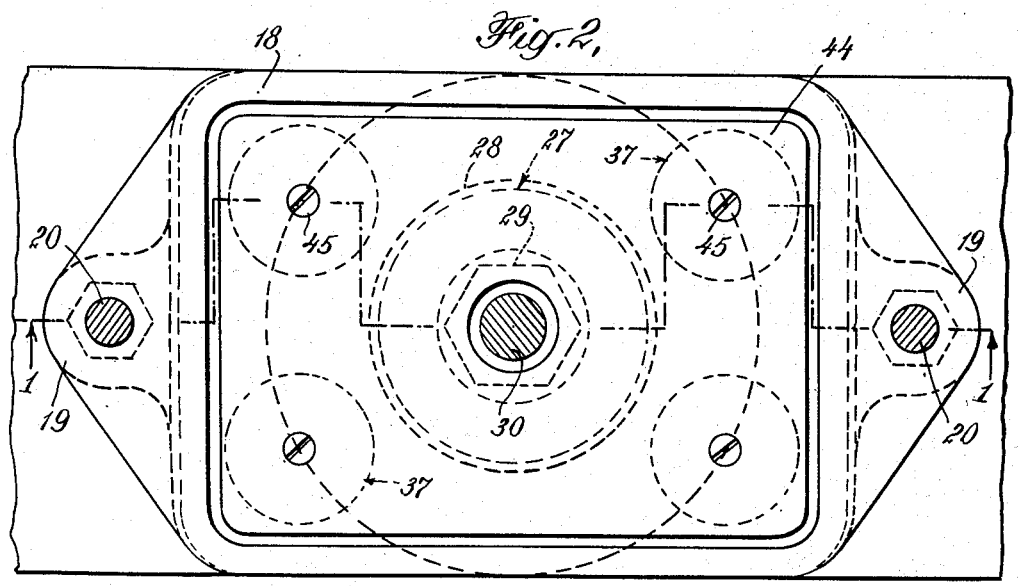

2,660,387

UNITED STATES PATENT OFFICE 2,660,387

VIBRATION AND SHOCK ISOLATOR

Nereus H. Roy, Glenbrook, Conn., assignor to Waugh Equipment Company, New York, N. Y., a corporation of Maine Application December 29, 1951, Serial No. 264,049

4 Claims. (Cl. 248—21)

This invention relates to mounts to be interposed between an object and a fixed support for carrying the weight of the object and protecting it against vibration and shock. More particularly, the invention is concerned with a heavy duty mount, which is suitable for use with objects of great weight and is capable of isolating vertical vibration and absorbing both vertical and horizontal shock. The new mount may be advantageously used on shipboard for supporting the elements of a diesel-electric system of propulsion, including the engine, generator, and motor, and a form of the new mount suitable for such application will, accordingly, be illustrated and described for purposes of explanation.

The mount of this application is an improvement on that disclosed in the co-pending application of Dilg and Munro, Serial No. 179,498, filed August 15, 1950, now abandoned, and is similar in some respects to that disclosed in the co-pending application of Munro, Serial No. 264,011, filed December 29, 1951.

In the past, marine diesel engines were bolted solidly and directly to the engine foundation but, more recently, it has been common to support such engines on mounts made up of nested coil springs interposed between the bed plates of the engine and the foundation, such spring units being of large capacity and capable of sustaining loads of the order of 1600 to 1800 lbs. per unit. Such a coil spring mount is open to the objection that it is capable of isolating vibration in a vertical direction only and does not protect the engine against heavy shocks, such as may result in a naval vessel from a hit or a near miss. Such a shock is thus liable to damage the mount, so that a misalignment of the engine and generator shafts sufficient to make operation of the engine impossible, may result. A further objection to the use of the former coil spring mounts is that they provide a direct metallic path from the engine to the ship structure and are, therefore, noisy.

The present invention is directed to the provision of a heavy duty mount, which may be used to support a massive vibrating object, such as a diesel engine, and is capable of isolating the vibration of the object and also of protecting it against shocks from all directions.

In its preferred form, the new mount includes a base adapted to be secured to a fixed support, such as the deck or other part of the structure of a ship. The base has an upright projection, which is hollow and closed at its upper end by a transverse wall lying below the extreme top of the base, so that, at the top, the base has a socket defined by the wall and a vertical peripheral flange. A head is attached to the object above the base and the head is preferably cup-shaped and provided at its upper end with lateral attaching flanges and at its lower end, with a tubular extension telescoping over the projection on the base. A shock-absorbing unit is mounted in the socket at the top of the base and engages the under side of the bottom of the head within the extension, and a second shock-absorbing unit rests upon the upper side of the bottom of the head. Tying means hold the assembly of the head, base, and units together, and a third shock-absorbing unit lies between the telescoped portions of the head and base. The head is secured to the object in such manner as to permit the object a limited freedom of vertical movement relative to the head, and a vibration-isolating unit is interposed between the head and object. The vibration-isolating unit isolates the normal vibration of the object and, if the support is subjected to heavy shock in any direction, the three shock-absorbing units absorb the shock and protect the object against damage.

For a better understanding of the invention reference may be made to the accompanying drawings, in which Fig. 1 is a vertical sectional view of one form of the new mount on the line 1—1 of Fig. 2; and Figs. 2, 3, and 4 are sectional views on the lines 2—2, 3—3, and 4—4, respectively, of Fig. 1.

The new mount, in the form illustrated in the drawings, comprises a base 10 having an upright projection 11 provided at its top with a transverse wall 12. A flange 13 extends vertically above wall 12 along its periphery, so that the top of the support provides a socket defined by the top of wall 12 and the flange 13. The base is provided with flanges 14 at its ends and is to be secured by cap-screws or bolts 15 to a rigid support 16.

The object to be supported is represented in the drawings at 17 and may, for example, be the bed plate of a diesel engine. A head 18 is interposed between the object and the base, and the head is of cup shape and provided at its upper edge with flanges 19 secured to the object for limited freedom of movement by bolts 20. The head is provided with a tubular extension 21 from its lower end, which telescopes over the projection 11 on the base, and a shock-absorbing unit generally designated 22 is interposed between the bottom of the head within extension 21 and the top of the transverse wall 12 of the base, the lower end of the unit lying within flange 13.

The shock-absorbing unit 22 is made up of a pair of rubber springs 23 separated by a divider ring 24. Each spring comprises a metal plate 25, on opposite faces of which are applied rings 26 of rubber. The plate 25 has openings arranged in a circle, through which the rings 26 are united by portions thereof, which pass through the openings. The unit 22 includes two rings and a divider plate, but more or less rings may be used according to the purpose, for which the mount is to be employed.

A second shock-absorbing unit 27 is mounted within the concavity of the head to rest upon the bottom thereof, and unit 27 in the mount shown comprises a single rubber spring only. A flat follower ring 28 rests on top of unit 27 and the top of the ring is engaged by a nut 29 on a bolt 30, which extends through a central opening in the wall 12 of the base, and aligned openings through the shock-absorbing units 22, 27, the bottom wall of the head, and follower ring 28. The head 31 of the bolt lies within an opening in the bottom of the transverse wall 12 of the base, and the wall has a recess 32 open at one side of the projection 12 of the base, so that the bolt may be passed through a metal washer 33 engaged by the head of the bolt and through a resilient washer 34 lying between the metal washer and the top of recess 32. The threaded end of the bolt passes upwardly beyond nut 29 and through an opening 35 in the object. A nut 36 is mounted on the threaded end of the bolt above the object.

A vibration-isolating unit made up of a plurality of spring units 37 rests on the bottom of the head within the concavity of the latter and engages the under surface of object 17. Each spring unit comprises a base plate 38, on which rests the lower end of a coil spring 39, plate 38 having a circular flange 40 on its upper face, which enters the spring to center it. The plate 38 and spring 39 lie within a cup 41 having an opening at its top, and a cup-shaped follower 42 rests on top of the spring and has a portion extending out of a central opening at the top of the cup. The lower end of the follower 42 enters the top of the spring, and the follower is provided with a circumferential flange 43, which engages the top of the spring. If desired and as shown, the followers 42 of the several spring units may be secured to a plate 44 by screws 45, the plate lying in contact with the under surface of object 17.

A rubber sleeve 46 is bonded to the outer surface of the projection 11 on the base at such a location as to lie within the extension 21 on the head and, to assist in holding the rubber sleeve in position, the projection 11 is provided with a circumferential channel 47, into which the rubber of the sleeve is forced. The sleeve is enclosed within a metallic wear sleeve 48, which is bonded to the outer surface of the rubber sleeve and lies in contact with the inner surface of the extension.

In the installation shown in Fig. 1, the nuts on bolts 20 are not drawn up so tightly as to force the flanges 19 of the head against the under surface of the base, and the weight of the object is thus taken by the vibration-isolating unit and by the shock-absorbing unit 22. The followers 42 of the spring units 37 project outwardly through the openings in caps 41 a distance greater than the amplitude of normal vibration of the object and, during such vibration, the object moves up and down without engaging the flanges 19 on the head.

In the event of a shock tending to move the support 16 vertically, the base will move upwardly relative to the head, and the head will also move upwardly until the flanges 19 engage the object. In such movement, the vibration-isolating unit is compressed, but the flanges 19 engage the object before the coil springs 39 in the spring units go solid. In the upward movement of the base, the shock-absorbing unit 22 is first compressed and subsequently both units 22 and 27 act to absorb the shock.

In the event of a shock tending to move the support downwardly relative to the object, the downward movement of the base causes bolt 30 to move with it and nut 29 on the bolt acts against follower 28 to compress shock-absorbing unit 27. If a vertical shock in either direction has a horizontal component tending to move the base relative to the head, that component is absorbed by compression of the third shock-absorbing unit comprising rubber sleeve 46 between the projection 11 of the base and the extension 21 of the head.

In normal operation, the vibration of the object is absorbed mainly by the spring units 37 of the vibration-isolating unit and to a much less extent by the shock-absorbing unit 22. Also, normal vibration of the object does not produce noise, because there is no direct metallic path from the object to the support through the mount.

I claim:

1. A mount for isolating vibration and absorbing shock between an object and a support, which comprises a base adapted to rest upon the support, means for securing the base rigidly to the support, a head, means for connecting the head to the object above the base, said means permitting limited vertical movement of the head relative to the object, shock-absorbing means connected to the base and engaging the head to resist vertical movement of the head toward and away from the base, shock-absorbing means engaging the head and base and resisting relative lateral movement of the base and head, and vibration-isolating means seated on the head at one end and adapted to engage the object at the other, said vibration-isolating means tending to urge the head and object apart to the limit permitted by said connecting means.

2. A mount for isolating vibration and absorbing shock between an object and a support, which comprises a base adapted to rest upon the support, means for securing the base rigidly to the support, a head, means for connecting the head to the object above the base, said means permitting limited vertical movement of the head relative to the object, shock-absorbing means connected to the base and engaging the head to resist vertical movement of the head toward and away from the base, shock-absorbing means engaging the head and base and resisting relative lateral movement of the base and head, and a plurality of vibration-isolating spring units seated in spaced relation on the head at one end and adapted to engage the object at the other, said spring units tending to urge the head and object apart to the limit permitted by said connecting means and acting to absorb vibration.

3. A mount for isolating vibration and absorbing shock between an object and a support, which comprises a base adapted to rest upon a support and having an upright projection, means for attaching the base rigidly to the support, a head having an extension from its lower end telescoping over the projection, means for connecting the head to the object for limited vertical movement relative to the object, shock-absorbing means connected to the base and engaging the head above and below to resist vertical movement of the head toward and away from the base, shock-absorbing means spaced from the first shock-absorbing means and lying between the telescoped parts of the head and base to resist relative lateral movement of the head and base, and vibration-isolating means seated on the head at one end and adapted to engage the object at the other, said vibration-isolating means tending to urge the head and object apart to the limit permitted by said connecting means.

4. A mount for isolating vibration and absorbing shock between an object and a support, which comprises a base adapted to rest upon the support and having an upright projection with a socket at its upper end, means for securing the base rigidly to the support, a head of cup shape having a tubular extension from its lower end telescoped over the projection, means for connecting the head to the object, said means permitting limited vertical movement of the head relative to the object, a first shock-absorbing unit seated on the bottom of said socket and engaging the head within the extension, a second shock-absorbing unit within the head and seated on the bottom thereof, a plate supported by the second unit below the top of the head, means engaging the base and plate and preventing them from moving apart, a third shock-absorbing unit spaced from the first and interposed between the telescoped parts of the extension and projection to resist relative lateral movement of the head and base, and a plurality of vibration-isolating spring units seated on the bottom of the head about the second shock-absorbing unit and extending above the top of the base in position to engage the object from beneath.

NEREUS H. ROY.

References Cited in the file of this patent

UNITED STATES PATENTS

| Number | Name | Date |
|---|---|---|
| 1,694,758 | Summers et al. | Dec. 11, 1928 |
| 1,998,206 | Rozenzweig | Apr. 16, 1935 |
| 2,189,708 | Coyne | Feb. 6, 1940 |